(12) United States Patent
Rothenberg et al.

(10) Patent No.: US 7,346,085 B1
(45) Date of Patent: Mar. 18, 2008

(54) MULTI-STAGE METHOD AND SYSTEM FOR COHERENT DIFFRACTIVE BEAM COMBINING

(75) Inventors: Joshua E. Rothenberg, Los Angeles, CA (US); Robert R. Rice, Simi Valley, CA (US); Michael G. Wickham, Rancho Palos Verdes, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 197 days.

(21) Appl. No.: 11/543,567

(22) Filed: Oct. 5, 2006

(51) Int. Cl.
*H01S 3/13* (2006.01)
(52) U.S. Cl. .............................. 372/29.016; 372/29.023
(58) Field of Classification Search ........... 372/29.016, 372/29.023, 9, 26
See application file for complete search history.

(56) References Cited

U.S. PATENT DOCUMENTS

| | | |
|---|---|---|
| 6,192,062 B1 | 2/2001 | Sanchez-Rubio et al. |
| 6,208,679 B1 | 3/2001 | Sanchez-Rubio et al. |
| 6,327,292 B1 | 12/2001 | Sanchez-Rubio et al. |
| 6,366,356 B1 | 4/2002 | Brosnan et al. |
| 6,697,192 B1 | 2/2004 | Fan et al. |
| 6,708,003 B1 | 3/2004 | Wickham et al. |

OTHER PUBLICATIONS

Shay, T.M. & Benham, V. "First Experimental Demonstration of Phase Locking of Optical Fiber Arrays by RF Phase Modulation". *Proceedings of SPIE* vol. 5550. pp. 313-319 (2004).

*Primary Examiner*—Armando Rodriguez (57) ABSTRACT

A system or method coherently combines a large number of light beams at a single wavelength in multiple stages to form a high-power diffraction limited output beam. A two-stage system, or method based thereon, includes a master oscillator transmitting a light beam to a first phase modulation stage, which splits the beam into N beams and locks beam phases using phase correction signals from a first feedback loop. A second phase modulation stage splits each N beam into M beams and locks the phases of M beams in each N group using phase correction signals from a second feedback loop. A two-dimensional fiber array directs M×N beams to a first diffractive optical element combining the beams into N coherent beams of M beams each, and phase correction signals for the second stage are derived from a sample extracted from the N coherent beams. A second diffractive optical element combines the N coherent beams into the output beam, and phase correction signals for the first stage are derived from a sample extracted from the output. The diffractive optical elements may operate as both beam combiners and beam samplers.

20 Claims, 7 Drawing Sheets

MULTI-STAGE METHOD AND SYSTEM FOR COHERENT DIFFRACTIVE BEAM COMBINING

This application is related to U.S. patent application Ser. No. 11/361,352 filed Feb. 24, 2006; U.S. patent application Ser. No. 11/543,677, entitled "Method And System For Coherent Beam Combining Using An Integrated Diffractive Beam Combiner And Sampler" filed concurrently herewith; U.S. patent application Ser. No. 11/543,613, entitled "Method and System For Diffractive Beam Combining Using DOE Combiner With Passive Phase Control" filed concurrently herewith; and U.S. patent application Ser. No. 11/543,596, entitled "Method And System For Hybrid Coherent And Incoherent Diffractive Beam Combining" filed concurrently herewith; all of which are fully incorporated herein by reference.

BACKGROUND OF THE INVENTION

1. Field of the Invention

The present invention relates to combining light beams using diffractive beam combining. More specifically, the invention relates to combining a plurality of laser beams in multiple stages, where in each stage, a diffractive optical element operating as a beam combiner diffracts a low power sample of combined beams for use in active phasing.

2. Description of Related Art

High power lasers have many possible applications. In a military application, sufficient energy focused in a laser beam can provide an effective defensive countermeasure against ballistic projectiles. In a commercial application, a high power laser can be used to weld metal components that are too thick to be welded by conventional methods. To improve the effectiveness of the laser in any of these applications, the power transmitted by the beam may be enhanced by focusing the beam to its far-field diffraction limit, i.e., into as small an area as theoretically possible. A laser beam focused to this theoretical limit is said to be diffraction limited. Generally speaking, advancement of the art of high power lasers is impeded by physical limitations encountered when attempting to achieve this limit.

Lasers by their nature are ideally diffraction limited, such that the smallest possible area of focus is limited by the product of the focal distance and the diffraction limited angle, which is the wavelength of the light divided by the aperture width. Thus, the larger the aperture, the tighter the focus. However, there are practical limitations on the size of an aperture that can be designed for any optical apparatus. Imperfections in the optics may cause degradations in the laser wavefront that affect the focus, and in high power applications, thermal variations contribute to the degradation. This limits the designer's ability to focus the beam, resulting in a focal spot somewhat greater than 1.0 times the diffraction limit (1.0×DL). Practically speaking, the designer's goal is to achieve a near-diffraction-limited laser (i.e., one that approaches 1.0×DL) that operates at as high a power level as possible.

At present, the most advanced near-diffraction-limited laser beams cannot deliver enough power per unit area to serve effectively in high-power applications. In one case, an optimized beam can deliver a 3 kW beam having a diffraction limit of nearly 1.0. In another case, an optimized beam can deliver a 10 to 12 kW beam that is about 1.5 times diffraction limited. An objective of ongoing research in this field is to design a laser generator that can deliver 100 kW or more in a near-diffraction-limited beam.

One method for increasing the power deliverable by lasers is to combine the power of many coherently phased beams of a common wavelength by arranging a plurality of optical fiber emitters in a two-dimensional array. A beam splitter may be placed at the output of the array to sample the constituent beams. Each of the sampled beams is directed to a phase sensor, and the measured error signals are provided to phase modulators in each beam to ensure all the beams have equal phase. However, even in the most tightly packed array, the 'fill factor' of the composite beam (ratio of the composite beam power to a beam that uniformly fills the entire array aperture and has equal peak intensity) is only about 70%, due to voids that occur between fibers and also to the Gaussian shape of each beam. The end result is a reduction in brightness by the fill factor ratio—the focused composite beam has a central peak intensity equal to the fill factor ratio times the maximum intensity possible with an ideal uniform beam, with the remaining power appearing in widely separated side lobes. In other words the composite beam has a shape dramatically different than that of the constituent beams, and as a result the composite does not focus as well as the constituents.

Another known method for combining beams is spectral combining, in which many incoherent beams, i.e. beams of different wavelengths, are superimposed. The beams are transmitted through a prism or grating that aligns the beams along a common path, creating, in essence, a singular beam of multiple colors. Thus the composite beam has a shape that is substantially identical to that of the constituent beams. While this technique therefore eliminates the fill factor problem associated with the two-dimensional array, other problems arise from using multiple wavelengths. For one, the complexity of the system increases as each wavelength requires a different oscillator. Furthermore, the propagation angle of each wavelength must be precisely adjusted such that its incidence on the grating is exact, otherwise the beams will misalign. More importantly, each wavelength may behave differently as the beam propagates through various media. Atmospheric absorption is a function of wavelength, therefore a spectrally combined beam directed through air is more susceptible to energy loss than a single-wavelength selected for optimal transmission efficiency. Spectral combining has been proposed, for example, in U.S. Pat. No. 6,697,192, U.S. Pat. No. 6,327,292, U.S. Pat. No. 6,208,679, and U.S. Pat. No. 6,192,062.

Another proposed technique for increasing the power in a laser beam is to (coherently) combine, by constructive interference, a plurality of beams into a single coherent beam. This technique, known as coherent diffractive beam combining, is the subject of co-pending U.S. patent application Ser. No. 11/361,352 filed Feb. 24, 2006, which is incorporated by reference herein as though set forth in full. In general, the co-pending application teaches generating a plurality of input beams, all having a common wavelength, using a master oscillator. Each beam is individually amplified and transmitted through a fiber emitter, and the emitter outputs are combined into a single output beam using a diffractive optical element (DOE). The technique includes a means for actively controlling the phases of the multiple beams using feedback to optimize the efficiency of the beam combination. This may be accomplished by coupling a phase modulator to each input beam, and by coupling a phase detector to a sampling of the output beam. The sampling is obtained by placing a transmissive beam splitter in the output path that reflects a low power portion of the output to the phase detector. Using electronics, correction signals based on phase deviations detected at the output are fed back to the modulators. An exemplary means for effecting active phase control in this fashion is disclosed in U.S. Pat. No. 6,708,003, which is also fully incorporated herein by reference. Another active phase detection and control method has been demonstrated by T. M. Shay et al., Proceedings of the SPIE, Vol. 5550, pp. 313-319 (2004), which is also fully incorporated herein by reference. An advantage of this approach is that, similar to SBC, the combined output beam has a shape that is substantially identical to the composite beams and therefore eliminates the fill factor reduction in the intensity of the focused coherent output beam. However, disadvantages occur when sampling the phases of the high power combined output beams. A high power beam passing through a transmissive beam splitter causes thermal distortion that affects the phase measurement accuracy and focusability of the output beam. Also in this method, a single detector is used to measure the phases of all the constituent beams. For a very large number of combined beams the accuracy of phase measurement becomes more difficult with a single detector.

SUMMARY OF THE INVENTION

The present invention provides a system and a related method for multi-stage diffractive beam combining for coherently combining a large number of light beams at a single wavelength into single high-power diffraction limited beam. In a preferred embodiment, a two-stage system includes a master oscillator for transmitting a light beam at a single wavelength. At a first phase modulation stage, the light beam is split into N beams (where N is any integer) and the phases of the N beams are synchronized by phase modulators using phase correction signals provided to the phase modulators through a first feedback loop. A second phase modulation stage splits each of the N beams into M beams (where M is any integer). Amplifiers and phase modulators in the second phase modulation stage amplify the beams and synchronize the phases of each N group of M beams using phase correction signals provided to the second stage phase modulators from a second feedback loop. From the second phase modulation stage, optical fiber emitters arrange the beams into a two-dimensional M×N array, and each beam is directed toward a first diffractive optical element (DOE) at a slightly different propagation angle. An optic (e.g. lens or curved mirror) may be used to collimate and overlap the beams for precise incidence on the first DOE. The first DOE operates as a beam combiner to combine the beams into N coherent beams each comprising M beams. In the second feedback loop, a sample beam is extracted from the N coherent beams and directed to N separate phase detection means, each of which detects phase variations in each of the M constituent beams. Phase correction signals are derived from the detected phases and fed back to the second stage phase modulators. In one embodiment, the sample beam is diffracted from a periodic sampling grating superimposed on the surface of the first DOE.

The N coherent beams output from the first DOE are preferably aligned along a single dimension and directed onto a second DOE. Relay optics may be used, if necessary, to ensure precision collimation and overlap of the beams incident on the second DOE. The second DOE also operates as a beam combiner, combining the N coherent beams into a single, diffraction limited output beam. In the first feedback loop, the output beam is sampled, and through phase detection means, phase correction signals for the first stage are derived from the sample and fed back to the first stage phase modulators. In one embodiment, the output sample is extracted using a periodic sampling grating superimposed on the surface of the second DOE.

One main advantage of multi-stage coherent diffractive beam combining according to the present invention is that the maximum number of beam phases being measured by any phase detector is reduced to about the square root of the total number of beams being combined.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. The invention will be better understood upon consideration of the specification and the accompanying drawings, in which like reference numerals designate like parts throughout the figures, and wherein:

DETAILED DESCRIPTION OF THE PREFERRED EMBODIMENTS

Single Stage Coherent Diffractive Beam Combining

A coherent diffractive beam combining method has been proposed in co-pending U.S. patent application Ser. No. 11/361,352 by inventors named in the present application. In general, the diffractive beam combining method employs a DOE to enable the coherent combination of the output of a plurality of fiber amplifiers transmitting laser beams derived from a common oscillator. The beam combination method requires active phasing of the outputs from the fiber amplifiers to lock the phases of the output beams in order to optimize intensity of the composite beam by means of constructive interference. Active phasing is achieved by placing a beam splitter in the path of the composite beam that is diffracted by the DOE. The beam splitter produces a low power sample of the composite beam, and the sample is focused onto a phase detector. In the phase detector, the output phase of each constituent beam is detected by decoding signals that are encoded on each constituent beam. Using electronics, the phases are measured by comparison to reference signals from the master oscillator, and correction signals derived from this comparison are fed back to phase modulators in a low power section of each fiber amplifier to achieve optimal phasing.

Multi-Stage Coherent Diffractive Beam Combining

Multi-stage coherent diffractive beam combining, as used herein, refers to a beam combining system or method that combines beams in plural stages, wherein a diffractive optical element operating as a beam combiner is employed at each stage. The phase detection method discussed in the context of single stage coherent beam combining may be impractical as the number of beams being detected becomes very large. To reduce this burden, a multi-stage coherent diffractive beam combining system and method is now disclosed. The multi-stage concept allows scaling to a much larger number of total combined beams without requiring detection of all constituent phases in a single combined beam.

Figure 1:
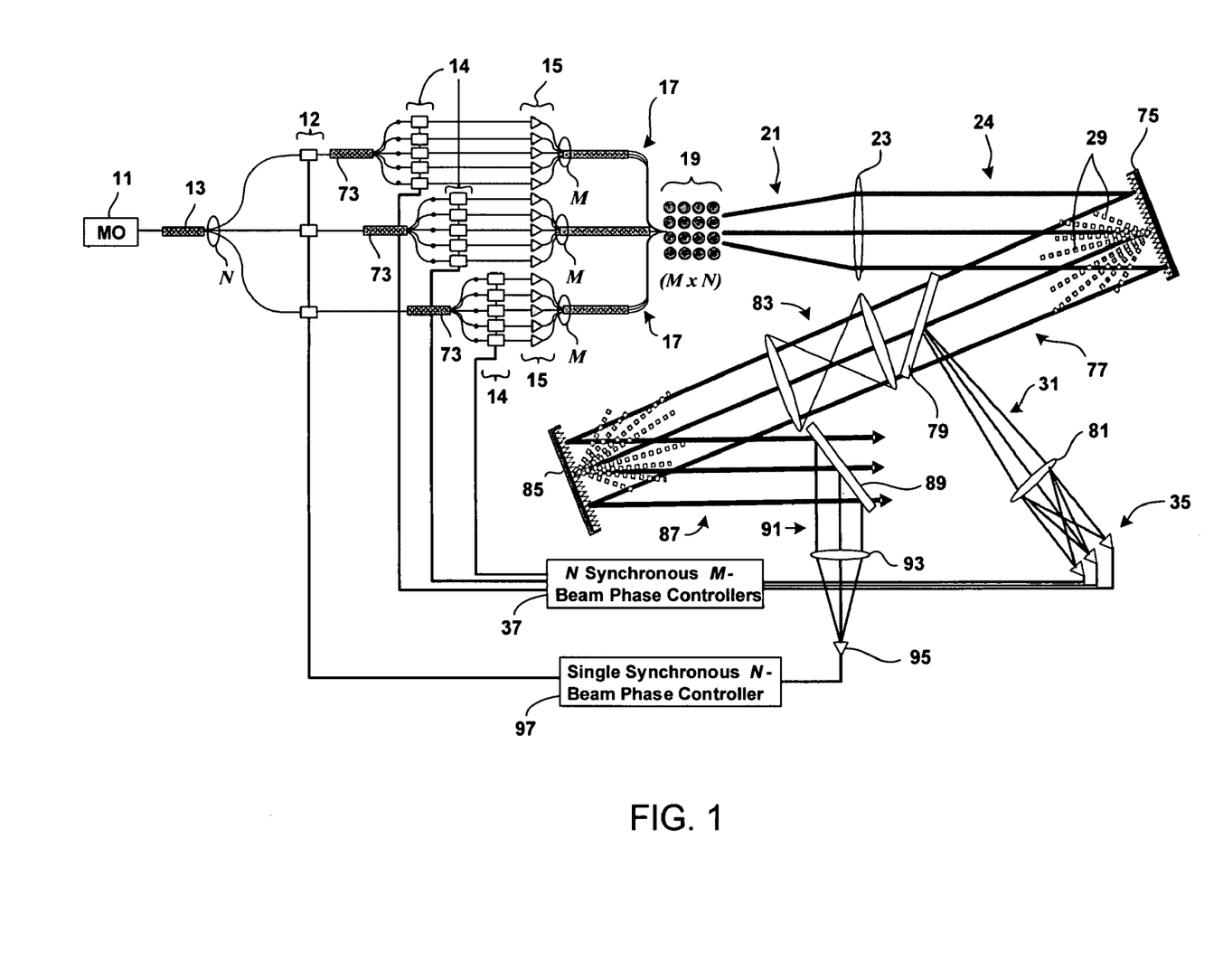
FIG. 1 is a block diagram of a multi-stage system according to the invention having two stages for coherent beam combining.

FIG. 1 shows a schematic of a multi-stage beam combining system according to the invention. In this embodiment, the multi-stage system consists of two beam combining stages, each stage having a feedback loop. A master oscillator 11 provides a master signal oscillating a wavelength λ to a first phase modulation stage, which includes phase modulators 12 and a beam splitter 13. At the first modulation stage, the master signal is split into N optical signals by beam splitter 13. Each of the N signals is passed through a corresponding one of N first stage feedback dependent phase modulators 12 for phase correction. Each of the N modulated first stage output beams is then input to a second modulation stage, which includes phase modulators 14 and N beam splitters 73.

At the second modulation stage, the N modulated first stage beams are each split M ways by a beam splitter 73. For simplicity, FIG. 1 shows N=3 and M=5; however, N and M may each assume any integer value. Each of the M×N second stage beams is then phase-corrected by means of a feedback dependent second stage phase modulator 14. Also at the second modulation stage, each second stage beam is amplified by one of M×N optical amplifiers 15 to a desired power level. Each group of M beams is then collected into a linear array of fiber emitters 17. N of these linear arrays are brought together to form a two-dimensional fiber array 19.

In one embodiment, fiber array 19 consists of M rows and N columns. Each of the N columns is a linear array of M fiber emitters 17 and consists of M amplified beams that originate from just one of the N first stage output beams. Therefore a phase change applied to a first stage phase modulator 12 is common and will not alter the relative phases of the M beams within the corresponding array column. In another embodiment, fiber emitters 17 are selected to transmit beams of like polarization.

Referring again to FIG. 1, a single reflective or transmissive collimating optic 23 may be used to collimate all the diverging beams 21 from fiber array 19. The output of collimating optic 23 results in an array 24 of collimated beams. Thus, each beam present in array 24 has a propagation angle that may be determined by the location of a corresponding individual fiber emitter within two-dimensional array 19. An M:1 DOE combiner 75 is located in the back focal plane of collimating optic 23, to ensure optimal overlap of the beams in collimated beam array 24 that are incident on DOE combiner 75.

DOE combiner 75 is oriented to combine the incident beams along the columns of array 24. When the beams are properly phased, DOE combiner 75 can efficiently combine each group of M beams per array column, i.e. N groups of M beams are coherently combined without reduction in fill factor. The result is a row of N coherently combined output beams 77, each having a different propagation angle determined by the position of the N columns within the two-dimensional array 19. In a preferred embodiment, the intensity of each coherent combination of M beams is maximized along a single diffraction order. In one embodiment, the single diffraction order is the $0^{th}$ diffraction order. In another embodiment, at least one coherent combination of M beams has a maximum intensity along the $0^{th}$ diffraction order. Some amount of spurious diffracted output beams 29 of minimal intensity also emerge from DOE 75.

Due to differences in the lengths of fibers in array 19, and to variations caused by vibrations and temperature fluctuations, slight variations in phase may occur in each of the M×N beams 21 emerging from the array. A feedback control loop for the second modulation stage is provided to correct these variations and lock the phases of each group of M beams to ensure maximum efficiency in coherent combinations thereof. In this second stage feedback loop, a beam sampler 79 directs a low power sample 31 from output beams 77 to N independent phase detectors 35. Additional focusing or collimating optics 81 (e.g. a lens or curved mirror) may be placed into the path of sample beams 31, as needed, to focus sample beams 31 onto phase detectors 35.

Phase detection stage 35 provides a means for detecting the phase of each of the M beams that form one of the N groups of output beam 77. Thus, each detector 35 need only measure M constituent phases in the respective combined sample beams 31, using a phase detection method known in the art.

In one embodiment, encoded signals may be applied to each of the M×N optical signals at the second phase modulation stage. Then, at phase detection stage 35, synchronous detection of the coded signals on each beam can be used to measure the output phase of each constituent beam. Ideally, N phase controllers 37 apply correction signals to lock the M measured phases at each wavelength to a single uniform value. However, systematic variations caused by the sampling optics or decoding electronics may require adjustment of each of the M phases to differing optimized values. These values can be determined by a calibration procedure that optimizes the combination efficiency of each group of M beams into a desired diffraction order. The phase controllers 37 compare the measured phases to these optimized reference values and derive correction signals based on the comparisons at each of N wavelengths. The M×N correction signals are fed back to M×N phase modulators 73, which lock the phases of each group of M optical signals according to the correction signals to optimize the combination efficiency for each of the N groups of M beams. Various known techniques for synchronous phase detection of optical signals (e.g. encoding using distinct dither frequencies, CDMA, TDMA, etc.) may be employed in the feedback loop without departing from the scope of the present invention. Examples of such techniques are discussed in greater detail in U.S. patent application Ser. No. 11/361,352, U.S. Pat. No. 6,366, 356, U.S. Pat. No. 6,708,003, and T. M. Shay et al., Proceedings of the SPIE, Vol. 5550, pp 313-319 (2004). These techniques should be selected to allow the combined beams to be phased for maximum combination efficiency.

To ensure adequate beam overlap, the row array of N collimated output beams 77 is image relayed by means of image relay optics 83 onto a second stage N:1 DOE combiner 85. The second stage DOE 85 is preferably oriented substantially orthogonally to the first stage DOE 75, so that beams 77 are combined along rows rather than columns. The output of DOE 85 is a single, coherent beam 87, and is the final output of the multi-stage system.

A feedback control loop for the first modulation stage is provided to correct phase variations and lock the phases of each of N constituent beams of coherent output beam 87 to ensure maximum efficiency of combination. In this first stage feedback loop, output beam 87 is sampled using a sampling optic or beam splitter 89, and the resulting sample beam 91 is incident on a single phase detector 95. In one embodiment, sample 91 may be focused by means of a collimating optic 93. Phase detector 95 measures the phases of the N constituent first stage beams. A synchronous detection means in phase detector 95 detects a dither or other orthogonal coding provided by the N first stage modulators in order to distinguish the constituent beams. The synchronous detection means may be similar to that used in the second stage feedback loop. In the first stage feedback loop, the measured phases are used to provide feedback to the first stage modulators. A single, synchronous N-beam phase controller 97 compares the measured phases to reference values, and derives correction signals based on the comparisons. These reference values can be determined by a calibration procedure that optimizes the combination efficiency of the N beams into a desired diffraction order. The correction signals are fed back to phase modulators 13, which lock the phases of each N signal issuing from master oscillator 11 according to the correction signals, thereby optimizing the combination efficiency of coherent output beam 87.

It should be appreciated that coherent output beam 87 is achieved using N independent phase detectors 35 in the second stage feedback, plus a single independent phase detector 95 in the first stage feedback. Thus, M×N beams are combined using N+1 total independent phase detectors. In addition, the maximum number of beam phases that must be measured from a sampled combined beam by any single phase detector is the greater of the two values M or N. Compared to single-DOE systems, the number of beam phases measured by a detector is advantageously reduced to about the square root of the total number of beams being combined.

Since the phase variations imposed by the first stage modulators are common to each group of M beams they should not affect the operation of the first stage combiner. However, it is possible that modulation from the first stage feedback loop may become a source of phase noise for the second stage combiner. This potential issue can be mitigated by designing the first stage feedback loop to have much larger bandwidth than the second stage.

In an alternative embodiment, separate first stage modulators may be avoided by adding a common modulation signal electronically to all M inputs of a group of second stage modulators. The concern with this approach is the potential for introducing differential phase modulation among the M beams in a group by a first stage phase change. Precise RF phasing and equivalence of the common phase change among the M modulators is needed, otherwise undesirable crosstalk between the feedback loops may result.

Figure 2:
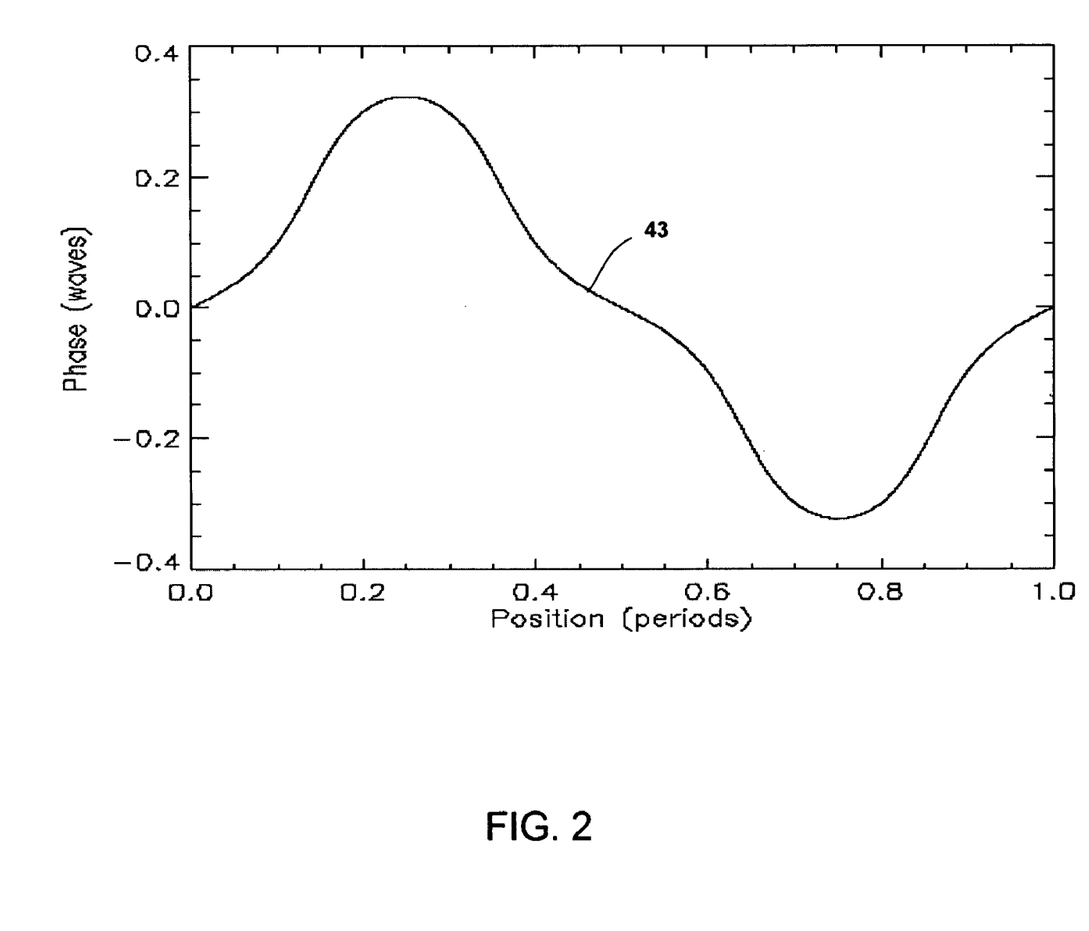
FIG. 2 is a plot of one example of a periodic phase pattern in a five-beam combiner DOE for splitting a single beam into five diffraction orders.
Figure 3:
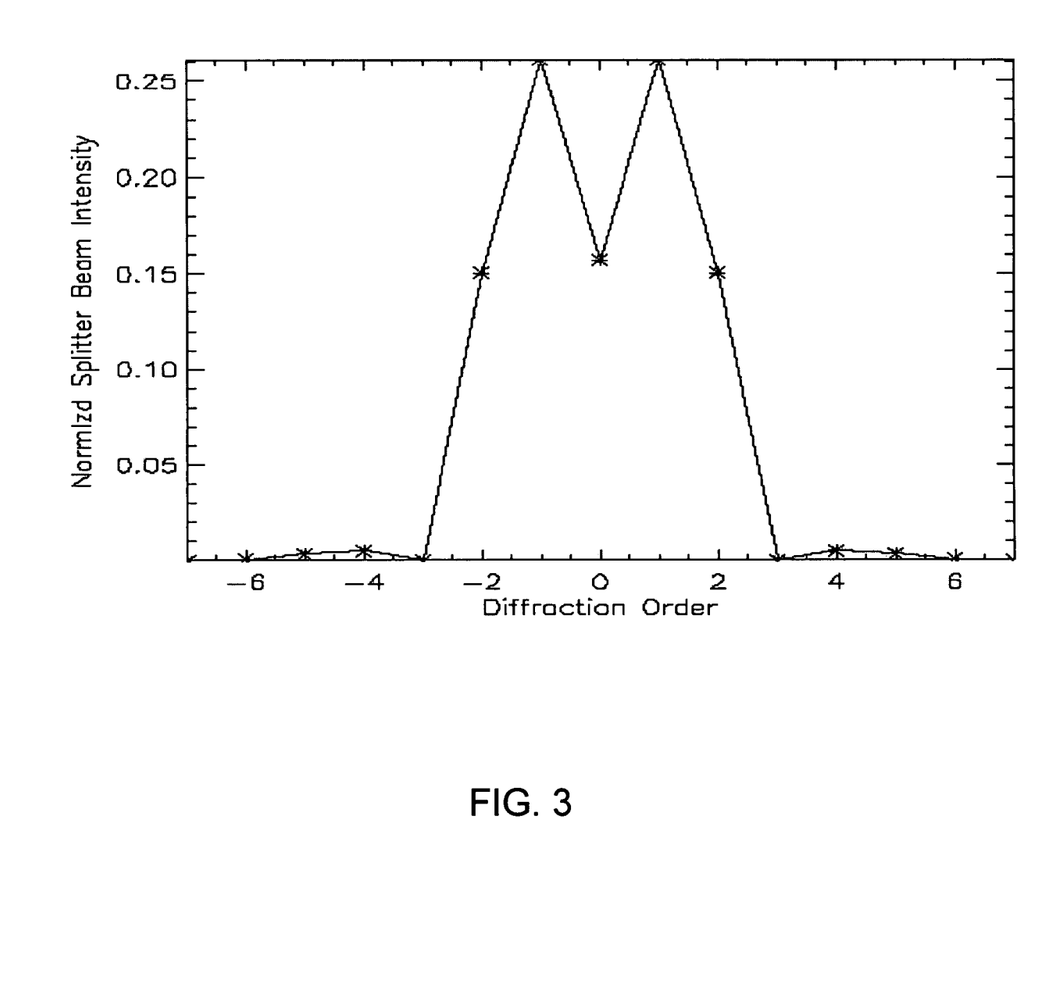
FIG. 3 is a plot showing normalized intensities of the five diffraction orders produced by the DOE of FIG. 2, when used as a beam splitter.

To further illustrate a DOE design appropriate for use in the foregoing embodiments, consider a simple DOE that splits a single beam into five diffracted beams in a 1D array. This simplified example is presented for illustration purposes only. DOEs can be designed to efficiently combine or split an arbitrarily large number of beams, in 1D or 2D arrays. The subject DOE has a pattern of parallel precisely-shaped main grooves etched on its surface, which upon reflection or transmission produces the 1D periodic phase pattern 43 plotted in FIG. 2 in waves (one wave equals $2\pi$ radians). For a reflective or transmissive DOE one wave of phase corresponds to an etch depth of $\lambda/2$ or $\lambda/(n-1)$, respectively, where n is the index of refraction of the DOE substrate. Thus, the phase pattern 43 corresponds to an appropriately scaled etch depth pattern on the DOE surface. If a single beam is incident on this DOE, approximately 98% of the power is split among five diffracted orders in a linear array. The remaining approximate 2% of power is distributed among spurious output beams diffracted at higher orders. A normalized plot of the distribution of the beam intensity among all diffracted orders is shown in FIG. 3. Note that the angles of the diffracted orders of the DOE are given by the usual grating equation. For an input beam at normal incidence the diffracted angle of the $m^{th}$ order is $$\sin \theta_m = m\lambda/P \qquad (1)$$

where $\lambda$ is the wavelength and P is the period of the phase pattern on the DOE.

Figure 4:
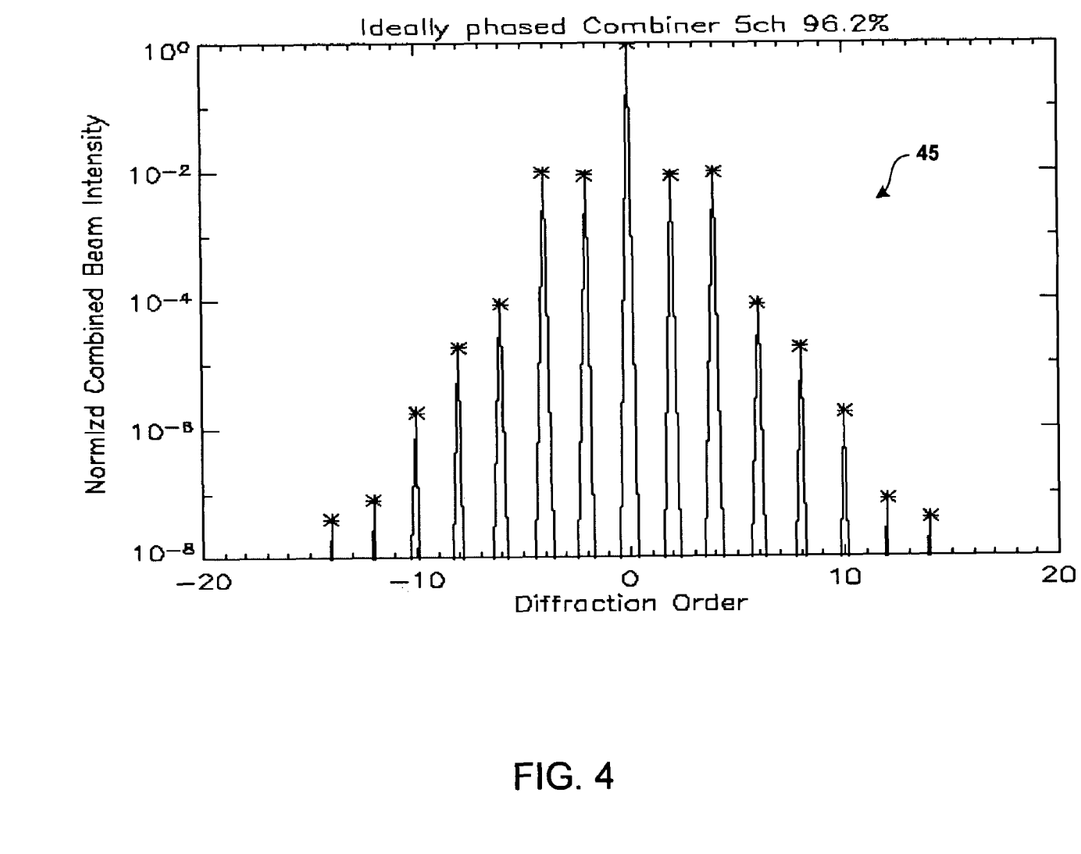
FIG. 4 is a logarithmic plot of normalized intensities vs. diffraction orders resulting when the DOE of FIG. 2 is used to combine five ideally phased beams.

Coherent beam combining is achieved by using the DOE "in reverse". That is, if (in the foregoing example) the five input beams are properly phased and pointed and have equal power, the DOE is designed to provide optimal efficiency of combination at about 96%. This efficiency is shown by the normalized intensities 45 of the diffracted orders plotted in FIG. 4. In this example, the desired output beam is the $0^{th}$ diffracted order, which has an intensity about two orders of magnitude higher than the intensity of any other diffraction order, as shown. In another embodiment, when the relative powers of the input beams are adjusted to match the distribution of FIG. 3, the DOE provides an optimal combination efficiency equal to the splitting efficiency of about 98%.

Figure 5:
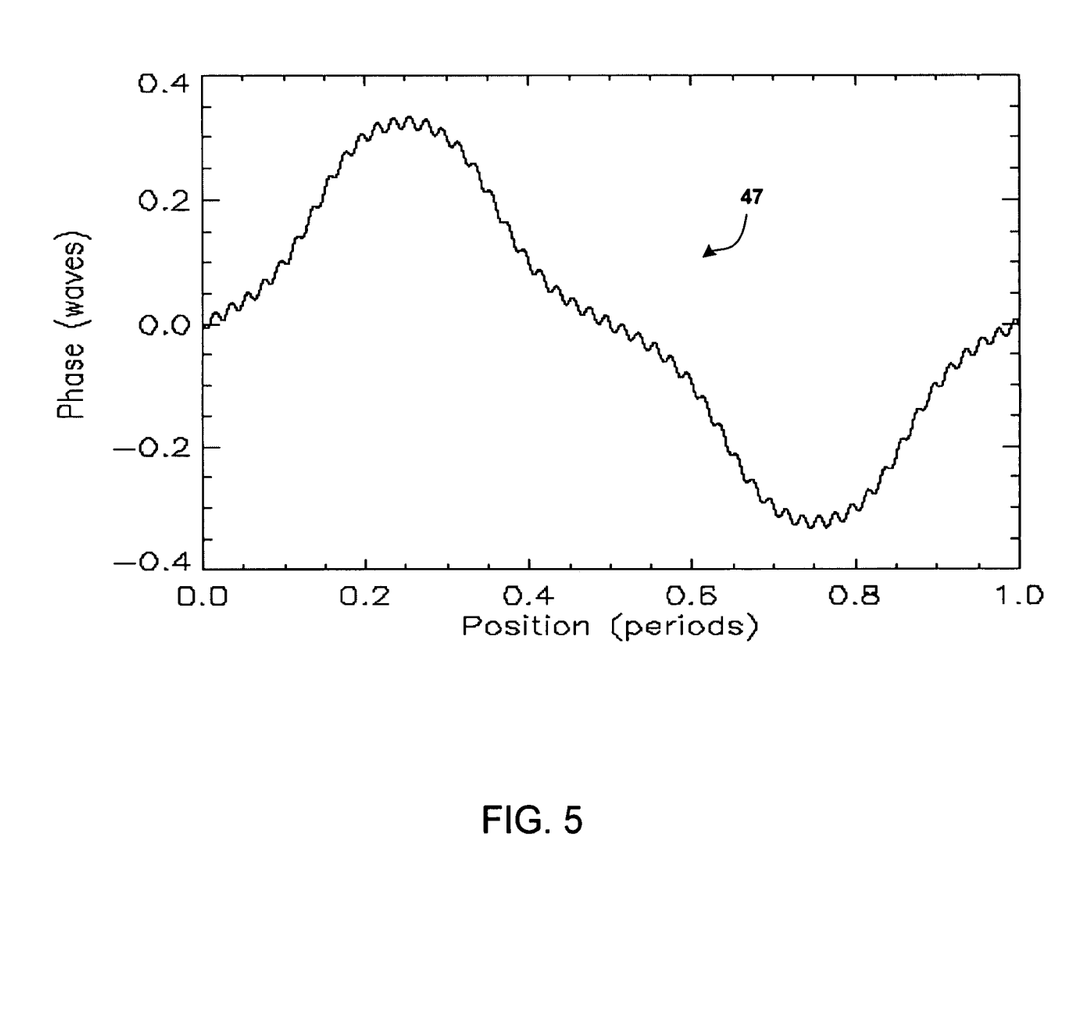
FIG. 5 is a plot of another example of a periodic phase pattern in a five-beam combiner DOE having an added sinusoidal sampling grating.
Figure 6:
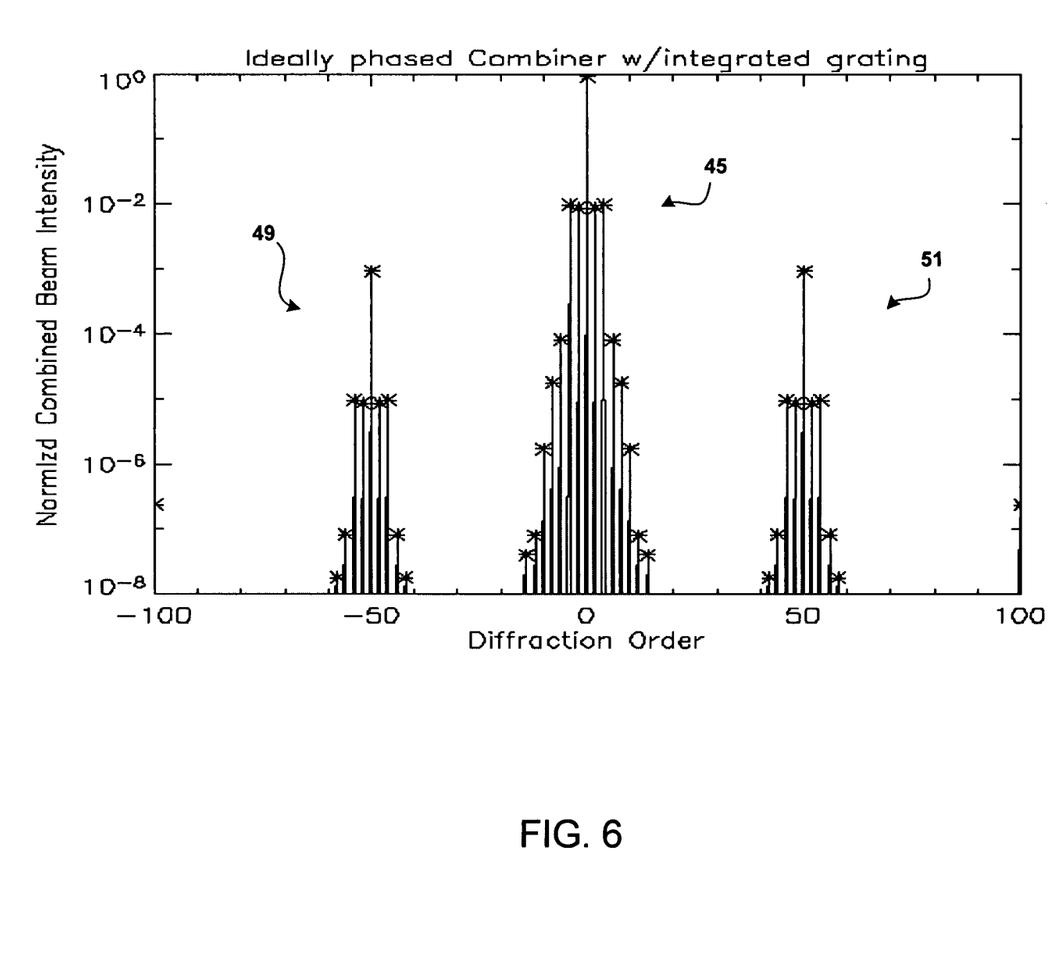
FIG. 6 is a logarithmic plot of normalized intensities of diffraction orders resulting when the DOE of FIG. 5 is used to combine five ideally phased beams.

FIGS. 5-6 illustrate the sampling capability of a DOE. In one embodiment, the design of the five-beam combiner DOE of FIGS. 2-3 may be modified by adding a weak, short-period sinusoidal sampling grating. The peak-to-peak phase value of this particular sampling grating is selected as $1/50^{th}$ of a wave. A plot of the phase of the modified DOE with sampling grating is shown in FIG. 5. Here, the resulting phase pattern 47 appears as the short-period sinusoid superimposed on periodic phase pattern 43. When properly aligned to the modified DOE, ideally phased input beams are diffracted to produce the output shown in FIG. 6. Note that in FIG. 6, the central group of diffraction order intensities 45 centered about the $0^{th}$ order is the same distribution shown in the plot of FIG. 4. The left-hand diffraction order intensities 49, and right-hand diffraction order intensities 51, are centered about the $-50^{th}$ and $+50^{th}$ orders, respectively. Each of these intensity groups 49 and 51 provides a low-power representation of the distribution of intensities 45.

The DOE embodiment illustrated in FIGS. 5-6 has sampling grating grooves situated in parallel to the main grooves and therefore the sampled beam is in the same plane as the fiber array and spurious diffracted output beams. The period of the sampling grating in this example is taken to be $1/50^{th}$ of the DOE combiner period, and thus the beam sample is diffracted at an angle corresponding to the $\pm 50^{th}$ diffracted order of the combiner. As shown in FIG. 6, the sampled beam diffraction order intensities 49 and 51 are well separated from the spurious diffracted orders of the DOE combiner function. Skilled artisans should recognize that many other DOE embodiments are possible, wherein a sampling grating comprising a set of grooves is applied in any direction relative to the DOE combiner function such that the sampled beam departs the DOE in any convenient direction.

In the foregoing example, the sampling grating phase depth is selected to be $1/50^{th}$ of a wave. As a result the sample intensity in either of the two $\pm 50^{th}$ sampled orders is approximately $1\times 10^{-3}$ of the main ($0^{th}$ order) output beam. As shown in FIG. 6, each of the primary sampled $\pm 50^{th}$ orders provides an identical low power copy of the fully combined beam. In general, a weak sinusoidal phase grating can be adjusted according to a desired sample fraction of approximately $2.5\phi^2$, where $\phi^2$ is the peak-to-peak phase amplitude of the grating measured in waves. The sinusoidal shape of a sampling grating leads to equal sampled beam intensities in both $\pm 50^{th}$ orders. In other embodiments of a DOE sampling grating, a "blazed" (i.e. more triangular) shape can be used to preferentially diffract light primarily into one of these orders, as is well understood in the grating art. However, for very high power applications, it may be necessary for the surface of the DOE to be etched more smoothly without any precipitous jumps. This advantageously allows the etched DOE to be over-coated with a very high reflectivity, low-absorption multilayer stack that conforms well and preserves the precise surface shape of the DOE.

It is noted that the sampling grating and the DOE combiner itself are dispersive, i.e. they have diffracted order angles that are wavelength dependent. At normal incidence, the dispersion for a grating with period P is given by $$d\theta/d\lambda = m/P \cos\theta = \tan\theta/\lambda \quad (2)$$

Thus, a smaller period or a larger diffraction angle leads to larger dispersion. Depending on the bandwidth requirements for the system this may lead to a limitation on diffraction angle. In some embodiments, it may be necessary to compensate for a sample beam having such a large dispersion, for example, by placing a compensation grating in the path of the diffracted sample.

Figure 7:
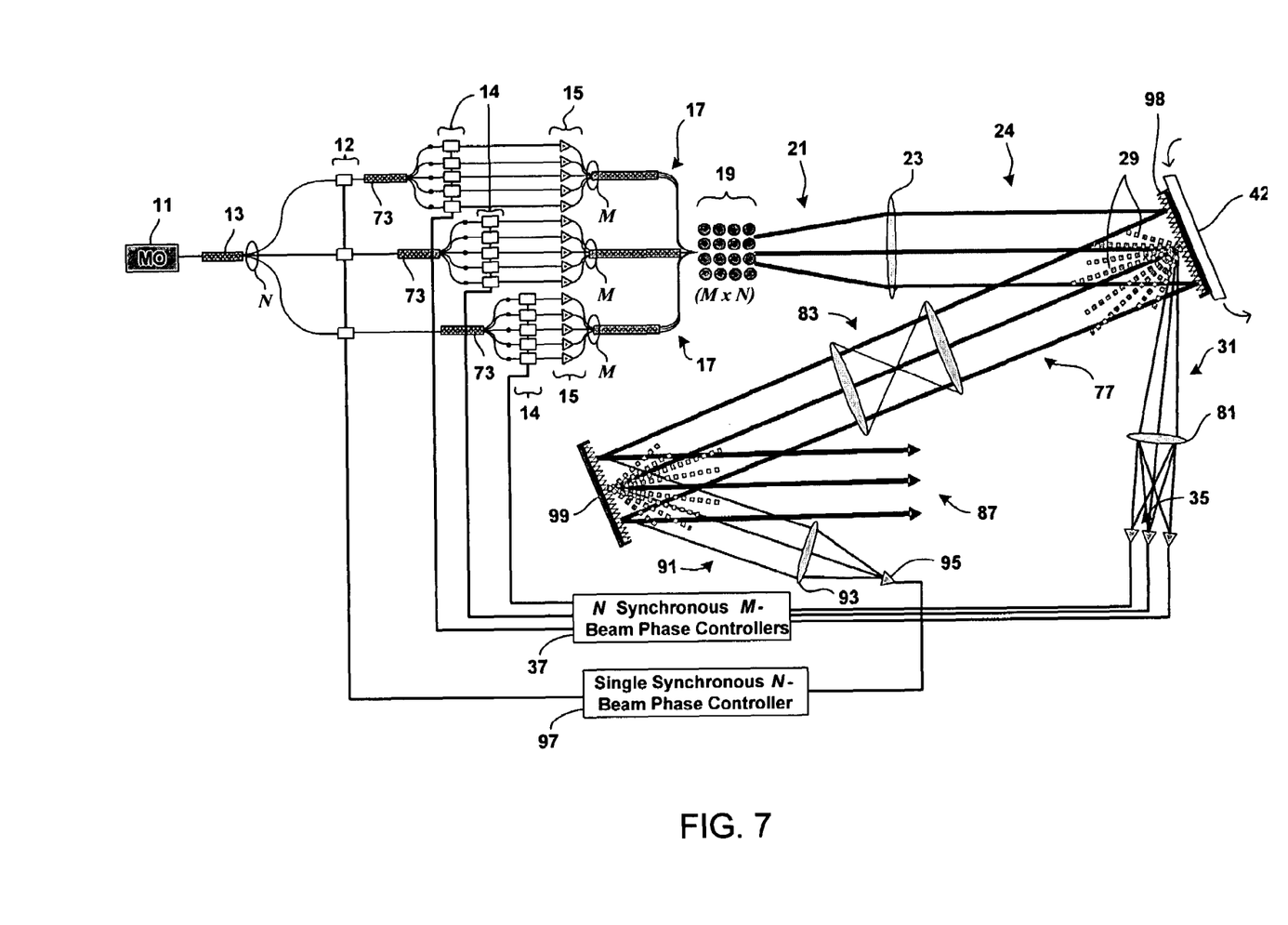
FIG. 7 is a block diagram of another embodiment of a multi-stage system according to the invention that employs a DOE combiner and sampler at each stage.

A second embodiment of a multi-stage coherent diffractive beam combining system is shown in FIG. 7. The optics in this embodiment are simplified by eliminating beam samplers 79 and 89 from the optical circuit, and employing DOEs fabricated with integral sampling gratings. Thus, the means for extracting a sample beam 31 or 91 is achieved by placing a weak periodic sampling grating superimposed on the surface of DOE combiners 98 and 99. The sampling grating enables each DOE 98 and 99 to diffract a low power sample beam for the second and first stage feedback loops, respectively. Each DOE 98 and 99 therefore performs the following functions: combining plural input beams into one or more coherent output beams, and diffracting a low power sample of the coherent output. Operation of the embodiment shown in FIG. 7 is otherwise similar to the operation of the embodiment shown in FIG. 1.

Throughout the disclosure, the various DOEs are shown in the figures as reflective optical elements. In one preferred embodiment, a DOE comprises a highly reflective dielectric stack on its surface having greater than 99% reflectivity to minimize power absorption. Alternatively, any DOE described herein may be fabricated as a transmissive element. However, reflective elements are preferred primarily because the non-reflecting side of a reflective element may be configured for cooling without introducing material into the optical path. In the example of FIG. 7, DOE 98 is shown with an optional cooling means 42 abutting the non-reflecting side. Cooling means 42 may be any type of heat sink suitable for removing heat from DOE 98 to ensure optical stability. For example, cooling means 42 may be a finned metal heat sink contacted to a DOE by an adhesive with high thermal conductivity, a surface exposed to forced air, a conduit for the flow of coolant such as water, or a combination of any of the foregoing.

An advantage of any of the embodiments according to the present invention is that each phase detector is only required to extract phases from at most M or N beams, yet the total number of combined beams in coherent output beam 87 is M×N. This approach thereby facilitates scaling to a much larger number of beams at a single wavelength than may be possible with the prior art.

The foregoing disclosure presents various embodiments of multi-stage coherent diffractive beam combining methods and systems having two stages. It will be apparent to skilled artisans that other embodiments are possible wherein more than two stages may be cascaded, wherein each stage combines a series of coherent beams diffracted from a previous stage. For example, as the number of beams to be combined becomes very large, it may be more practical to employ a DOE combiner at an initial or intermediate stage for combining partial rows or partial columns of beams propagating from an array. Additional DOE combiners in one or more downstream stages may then complete the row or column combination.

The invention has been presented in an illustrative style. The terminology employed throughout should be read in an exemplary rather than a limiting manner. While various exemplary embodiments have been shown and described, it should be apparent to one of ordinary skill in the art that there are many more embodiments that are within the scope of the subject invention. Accordingly, the invention is not to be restricted, except in light of the appended claims and their equivalents.

What is claimed is:

1. A system for combining a plurality of light beams into a single coherent output beam in multiple stages, comprising:
    a master oscillator transmitting a light beam;
    a beam splitter splitting the light beam into N light beams;
    a first phase modulation stage comprising N phase modulators modulating the N light beams;
    a group of N beam splitters further splitting each of the N light beams into N groups of M light beams for a total of M×N light beams;
    a second phase modulation stage comprising N groups of M modulators modulating the M×N light beams;
    a first diffractive optical element combining M×N light beams from the second phase modulation stage into N coherent beams of M beams each;
    a means for sampling the N coherent beams;
    a second feedback loop deriving M×N phase correction signals from the sampling of N coherent beams for locking phases of M light beams in each of N groups at the second phase modulation stage;
    a second diffractive optical element combining the N coherent beams into a single coherent output beam;
    a means for sampling the single coherent output beam; and
    a first feedback loop deriving N phase correction signals from the sampling of the single coherent output beam for locking phases of the N light beams at the first phase modulation stage; wherein M and N are integers greater than 1.

2. The system of claim 1 wherein at least one coherent beam has a maximum intensity along a single diffraction order of a diffractive optical element.

3. The system of claim 1 further comprising optical emitters directing the M×N light beams from the second phase modulation stage to the first diffractive optical element.

4. The system of claim 3 wherein the optical emitters direct the light beams as a two-dimensional array having M rows and N columns.

5. The system of claim 1 further comprising an amplification stage for amplifying each of the M×N light beams to a desired power level prior to combining.

6. The system of claim 1 wherein a beam splitter comprises the means for sampling the N coherent beams.

7. The system of claim 1 wherein diffraction by the first diffractive optical element provides the means for sampling the N coherent beams.

8. The system of claim 1 wherein a beam splitter comprises the means for sampling the single coherent output beam.

9. The system of claim 1 wherein diffraction by the second diffractive optical element provides the means for sampling the single coherent output beam.

10. The system of claim 1 wherein the second diffractive optical element is oriented substantially orthogonally to the first diffractive optical element.

11. The system of claim 1 wherein the second feedback loop comprises N phase detectors, and the first feedback loop comprises a single phase detector.

12. A system for combining a plurality of light beams into a single coherent light beam in multiple stages, comprising:
 a master oscillator transmitting a light beam;
 a first phase modulation stage including
  a beam splitter splitting the light beam into N light beams; and
  N phase modulators modulating the N light beams;
 a second phase modulation stage including
  a group of N beam splitters further splitting each of the N light beams into N groups of M light beams for a total of M×N light beams; and
  N groups of M modulators modulating the M×N light beams;
 optical emitters transmitting only beams of like polarization from the second phase modulation stage;
 a first diffractive optical element combining M×N light beams of like polarization from the second phase modulation stage into N coherent beams of M beams each;
 a means for sampling the N coherent beams;
 a second feedback loop deriving M×N phase correction signals from the sampling of N coherent beams for locking phases of M light beams in each of N groups at the second phase modulation stage;
 a second diffractive optical element combining the N coherent beams into a single coherent output beam;
 a means for sampling the single coherent output beam; and
 a first feedback loop deriving N phase correction signals from the sampling of the single coherent output beam for locking phases of the N light beams at the first phase modulation stage;
 wherein M and N are integers greater than 1.

13. A method for combining a plurality of light beams into a single coherent light beam in multiple stages, comprising:
 transmitting a light beam;
 splitting the light beam into N light beams at a first stage;
 splitting each of the N light beams into M light beams at a second stage;
 deriving first stage phase correction signals from the N light beams;
 deriving second stage phase correction signals from the M light beams in each N group;
 locking phases of the M light beams in each N group according to the second stage phase correction signals;
 locking phases of the N light beams according to the first stage phase correction signals;
 combining the M×N light beams by diffraction into N coherent beams of M beams each; and
 combining the N coherent beams by diffraction into a coherent output beam;
 wherein M and N are integers greater than 1.

14. The method of claim 13 further comprising, prior to the first combining step, forming the M×N light beams into a two-dimensional array.

15. The method of claim 14 further comprising directing the M×N array to a diffractive optical element.

16. The method of claim 15 further comprising, prior to the second combining step, directing the N coherent beams to a second diffractive optical element.

17. The method of claim 13 wherein the first combining step further comprises extracting a sample of the combined M×N light beams.

18. The method of claim 17 wherein the second stage phase correction signals are derived from the extracted sample.

19. The method of claim 13 wherein the second combining step further comprises extracting a sample of the combined N coherent beams.

20. The method of claim 19 wherein the first stage phase correction signals are derived from the extracted sample.

* * * * *